Patented Aug. 23, 1927.

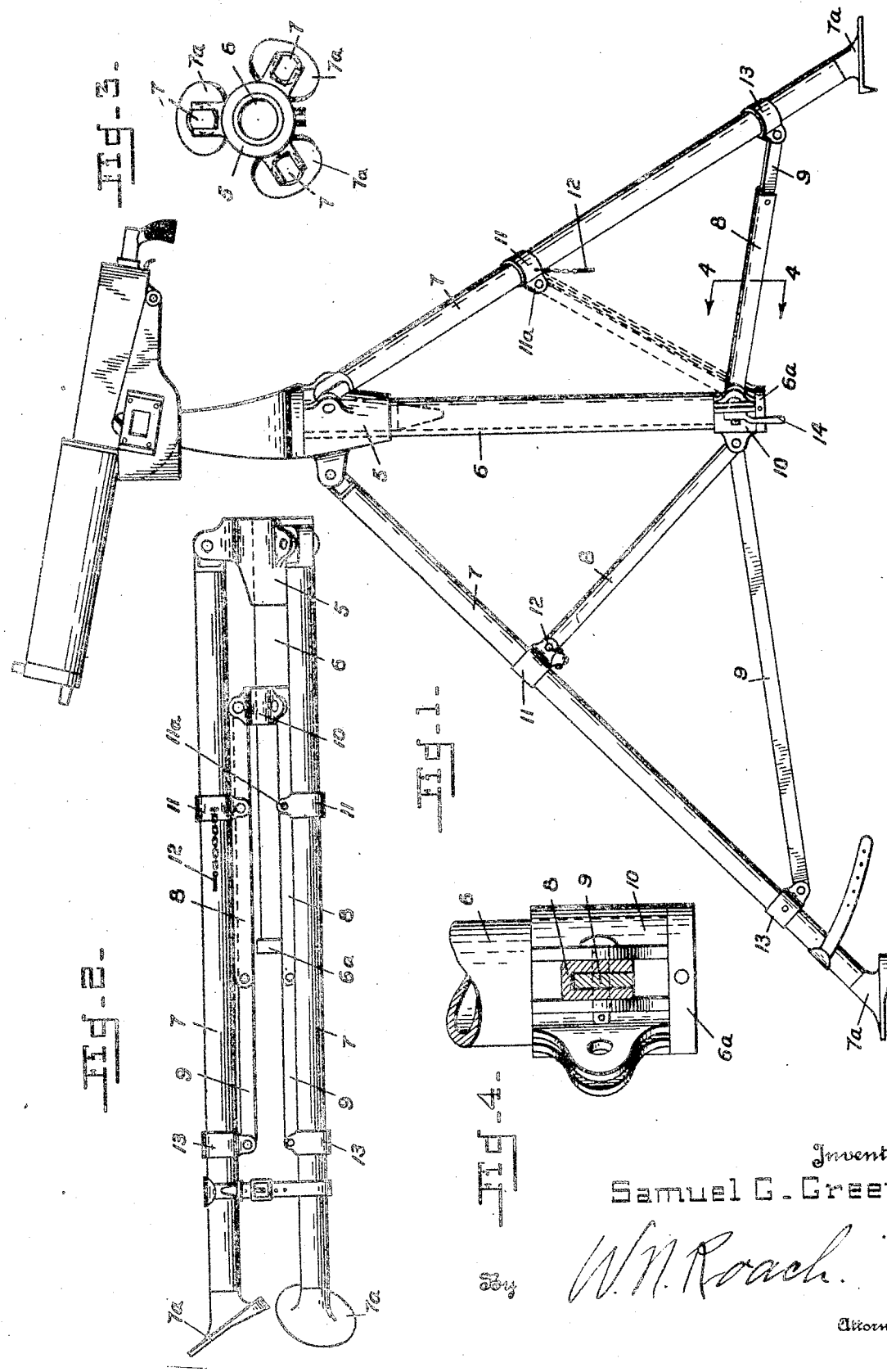

1,639,846

UNITED STATES PATENT OFFICE.

SAMUEL G. GREEN, OF GRAY, GEORGIA.

TRIPOD MOUNT.

Application filed March 31, 1927. Serial No. 180,020.

(GRANTED UNDER THE ACT OF MARCH 3, 1883; 22 STAT. L. 625.)

The invention described herein may be used by the Government, or any of its officers or employees in prosecution of work for the Government, or by any other person in the United States, without payment to me of any royalty thereon, in accordance with the act of March 3, 1883.

The subject of this invention is a tripod mount especially adapted for anti-aircraft guns.

In directing a gun for high angle firing against rapidly moving aerial targets it is desirable that the mount be sufficiently elevated to provide for proper aiming and manipulation of the gun. The mount should be portable and capable of rapid adjustment to its extended and folded positions and it is therefore necessary to reduce its weight to a minimum without sacrifice of stability, rigidity and compactness.

A consideration of the foregoing requirements for a mount capable of supporting twin guns has led to the development of the present tripod which is characterized by the fact that the braces and their sustaining members form a truss of a combination of triangles whereby the tendency to spread the mount is offset by the tendency to contract it so that the resultant thrust transmitted to the mount will be well within the base of the tripod.

With the foregoing and other objects in view, my invention resides in the novel arrangement and combination of parts and in the details of construction hereinafter described and claimed, it being understood that changes in the precise embodiment of the invention herein disclosed may be made within the scope of what is claimed without departing from the spirit of the invention.

A practical embodiment of the invention is illustrated in the accompanying drawings, wherein:

Fig. 1 is a view in side elevation of a mount constructed in accordance with the invention;

Fig. 2 is a side view of the mount in folded position;

Fig. 3 is an end view thereof; and

Fig. 4 is an enlarged sectional view on the line 4—4 of Fig. 1.

Referring to the drawings by numerals of reference:

There is shown a tripod mount comprising a central head 5 to which is rigidly fixed a depending hollow post 6 formed at its lower extremity with a collar 6a. Pivoted to the head at regular intervals are the three legs 7 all of equal length and provided with feet 7a. The legs are maintained in spaced relationship by means of sets of braces 8—9, each set having a common pivot on a sliding clamp 10 on the post 6, so that the upper brace may, when detached from its bracket 11 by removal of the pin 12 be lowered to nest with the lower brace 8, the braces being formed for nesting, preferably as shown in Fig. 1. The lower brace is pivoted to the bracket 13 which, similar to the bracket 11, is fixed to the leg. The upper brace is perpendicular to the leg 7 and the lower brace is substantially perpendicular to the post 6.

When the tripod is erected with the clamp 10 at the lower end of the post 6 the braces 8 and 9 and their sustaining members, the legs 7 and post 6, form a combination of substantially isosceles right angle triangles.

A handle 14 is provided on the clamp 10 for securing it in place when the upper brace is not connected and also when the tripod is folded.

In folding the tripod the upper braces are detached and allowed to fall on the lower braces. The clamp 10 is then moved toward the head 5 drawing the legs in towards the post and causing the folded braces to fit into the bifurcated end 11ª of the bracket 11.

I claim:

1. In a mount, a central head, a post rigid therewith, a plurality of legs pivotally attached to the head, a clamp slidable on the post, a lower brace pivoted to each side of said legs and the clamp and substantially equal in length with the post, a bifurcated bracket on each leg, an upper brace pivoted in common with the lower brace to the clamp and detachably secured to the bracket, said upper brace arranged to nest with the lower brace when detached and be received in the bifurcated bracket when the mount is folded.

2. In a mount, a central head, a post rigid therewith, a plurality of legs pivotally attached to the head, a clamp slidable on the post, a lower brace pivoted to each of said legs and the clamp and an upper brace pivoted in common with the lower brace to the clamp and detachably secured to the leg.

3. In a mount, a central head, a post rigid therewith, a plurality of legs attached to the head, a pair of braces connecting each leg and the post and forming therewith a combination of substantially isosceles right angle triangles.

4. In a mount, a central head, a post rigid therewith, a plurality of legs attached to the head, a brace connecting each leg and the post, and a second brace connecting each leg and post and perpendicular to the leg.

SAMUEL G. GREEN.